United States Patent
Kutsch et al.

(10) Patent No.: US 12,441,674 B2
(45) Date of Patent: Oct. 14, 2025

(54) SYSTEM AND METHOD FOR GENERATING SYNTHETIC FUEL

(71) Applicant: Syntholene Energy Corp., Harvard, IL (US)

(72) Inventors: John Kutsch, Harvard, IL (US); Jack H. Williams, Girton (GB)

(73) Assignee: SYNTHOLENE ENERGY CORP., Harvard, IL (US)

( * ) Notice: Subject to any disclaimer, the term of this patent is extended or adjusted under 35 U.S.C. 154(b) by 0 days.

(21) Appl. No.: 19/053,800

(22) Filed: Feb. 14, 2025

(65) Prior Publication Data

US 2025/0263359 A1    Aug. 21, 2025

Related U.S. Application Data (60) Provisional application No. 63/554,759, filed on Feb. 16, 2024.

(51) Int. Cl.
| | | |
|---|---|---|
| *C07C 29/152* | (2006.01) | |
| *B01J 19/24* | (2006.01) | |
| *C07C 1/12* | (2006.01) | |
| *C07C 1/22* | (2006.01) | |

(52) U.S. Cl.
CPC ......... *C07C 29/152* (2013.01); *B01J 19/2485* (2013.01); *C07C 1/12* (2013.01); *C07C 1/22* (2013.01); *B01J 2219/2419* (2013.01); *B01J 2219/2443* (2013.01)

(58) Field of Classification Search
CPC . C07C 29/152; C07C 1/12; C07C 1/22; B01J 19/2485; B01J 2219/2419; B01J 2219/2443
See application file for complete search history.

(56) References Cited

U.S. PATENT DOCUMENTS

| | | |
|---|---|---|
| 2012/0141356 A1 | 6/2012 | Brickey et al. |
| 2013/0060070 A1 | 3/2013 | Huber et al. |
| 2017/0130582 A1 | 5/2017 | Hsu |
| 2021/0261479 A1 | 8/2021 | Reinikainen et al. |
| 2023/0356177 A1 | 11/2023 | De Sarkar et al. |

OTHER PUBLICATIONS

International Search Report issued in connection with International Patent Application No. PCT/US2025/015951, dated Apr. 11, 2025, 2 pages.
Written Opinion issued in connection with International Patent Application No. PCT/US2025/015951, dated Apr. 11, 2025, 6 pages.

*Primary Examiner* — Jafar F Parsa
(74) *Attorney, Agent, or Firm* — Klintworth & Rozenblat LLP (57) ABSTRACT

A fuel generator and a method for generating fuel are disclosed in which a monolithic block includes a plurality of plates stacked and bonded together. A first input port and a second input port are disposed on the monolithic block. The first input port is coupled to a source of hydrogen gas and the second input port is coupled to a source of carbon dioxide or syngas. An output port is disposed on the monolithic block and is coupled to a fuel reservoir. The plurality of plates form a plurality of reaction regions. At least a portion of the plurality of reaction regions convert one of the carbon dioxide or syngas and hydrogen into a hydrocarbon fuel that is supplied from the output port.

16 Claims, 11 Drawing Sheets

SYSTEM AND METHOD FOR GENERATING SYNTHETIC FUEL

CROSS-REFERENCE TO RELATED APPLICATION

The present application claims priority to Kutsch, U.S. Provisional Patent Application Ser. No. 63/554,759, filed Feb. 16, 2024, and entitled "Progressive Cascade Compact Oligomerizer for Efficient Evolution of Liquid Hydrocarbon Fuels," the entire contents of which are incorporated herein by reference.

FIELD OF DISCLOSURE

The present subject matter relates to systems and methods for generating synthetic fuel and more particularly, a system and method for generating synthetic fuel from syngas.

BACKGROUND

Synthetic hydrocarbon fuels are a viable and sustainable substitute for conventional fuels extracted from petroleum sources, particularly in transportation applications that may consume substantial quantities of fuel. Such fuels have more energy density compared to other sources of energy such as hydrogen, batteries, non-hydrocarbon fuel, and the like and are particularly suited for use in, for example, aviation and maritime applications. The Fischer-Tropsch synthetic fuel production process uses catalyzed chemical reactions undertaken at high temperatures (between 150° and 300° Celsius) to convert syngas, a mixture of carbon monoxide and hydrogen gases in the presence of catalysts, into liquid hydrocarbons. The liquid hydrocarbons that result from these chemical reactions may include products such as diesel fuel, jet fuel, lubricants, blend stocks for gasoline fuels, and the like. The methanol to oligomerizer process generates hydrocarbon chains that are lengthened through a series of condensation polymerization reactions that result in alkane and alkene products.

A conventional production plant for production of synthetic fuels using the Fischer-Tropsch and related processes may include a number of discrete processing and storage tanks for producing and storing intermediate products, pipelines that connect such discrete tanks, and heating and cooling systems connected to such tanks and pipelines to maintain the temperature of the contents thereof to sustain the chemical reactions associated with this process.

SUMMARY

According to one aspect, a fuel generator includes a monolithic block comprising a plurality of plates stacked and bonded together. A first input port is disposed on the monolithic block and is coupled to a source of hydrogen gas, a second input port is disposed on the monolithic block and is coupled to a source of carbon dioxide or syngas, and an output port is disposed on the monolithic block and is coupled to a fuel reservoir. The plurality of plates form a plurality of reaction regions, wherein at least a portion of the plurality of reaction regions convert one of the carbon dioxide or syngas and hydrogen into a hydrocarbon fuel that is supplied from the output port.

A method for generating fuel includes providing a monolithic block. The monolithic block is formed from a plurality of plates stacked and bonded together to form a plurality of reaction regions. The monolithic block includes a first input port, a second input port, and an output port. The method further includes supplying hydrogen gas to the first input port, supplying one of carbon dioxide or syngas to the second input port, converting the hydrogen gas and one of the carbon dioxide or syngas in the plurality of reaction region into a hydrocarbon fuel, and supplying the hydrocarbon fuel from the output port.

Other aspects and advantages will become apparent upon consideration of the following detailed description and the attached drawings wherein like numerals designate like structures throughout the specification.

DETAILED DESCRIPTION

Figure 1:
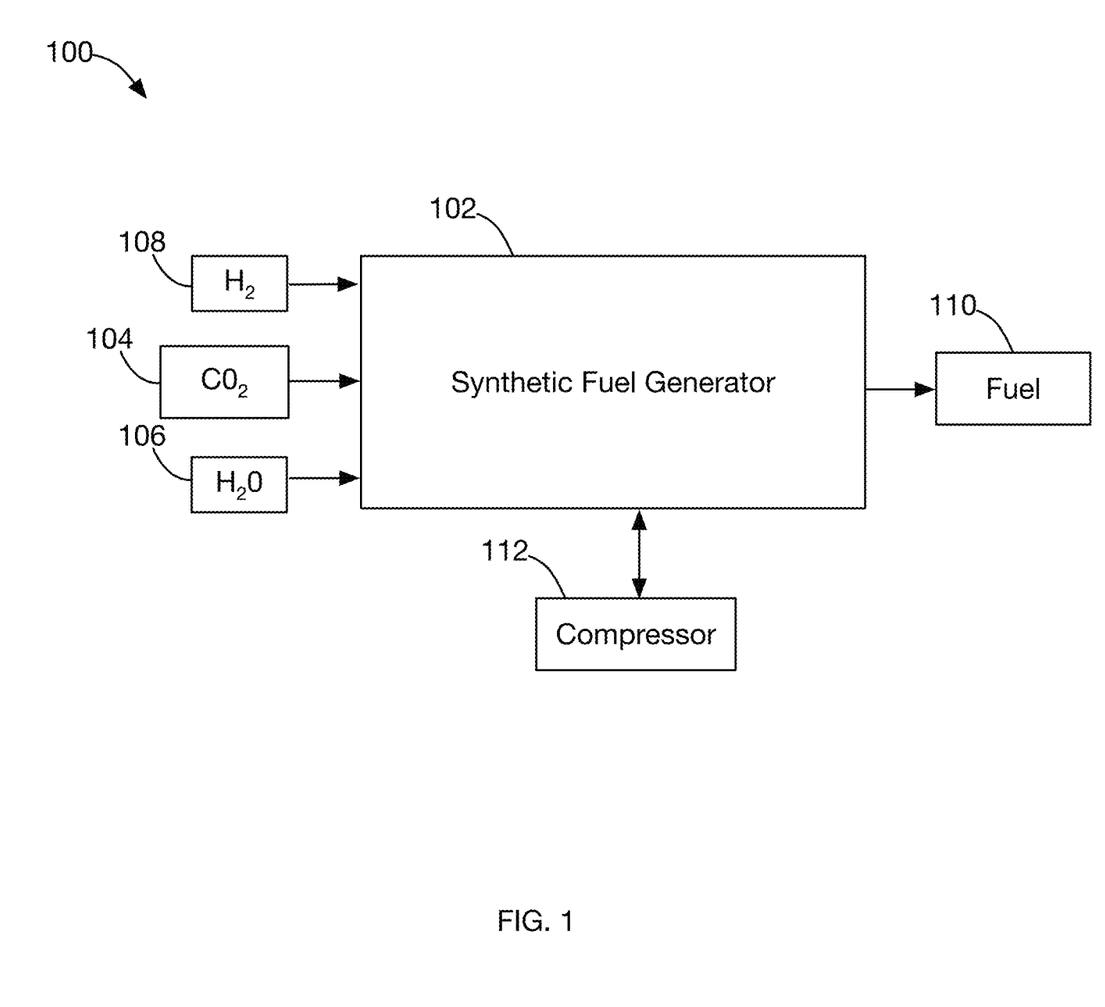
FIG. 1 is a schematic diagram of a fuel generation system in accordance with the present disclosure.

Referring to FIG. 1, a synthetic fuel generation system 100 to produce hydrocarbon fuel includes a monolithic fuel generator 102. Carbon dioxide from a carbon dioxide source 104, water from a water source 106, and hydrogen gas from a hydrogen gas source 108 are provided to fuel generator 102. The fuel generation system 100 processes the carbon dioxide, water, and hydrogen supplied thereto as described below to produce hydrocarbon based fuel that is supplied to and stored in a fuel reservoir or holding tank 110. In some embodiments, syngas (a mixture of hydrogen and carbon monoxide) may be provided to the fuel generator 102 instead of carbon dioxide and the fuel generation system 100 processes the syngas, water, and hydrogen supplied thereto to produce the hydrocarbon based fuel. In addition, the synthetic fuel generation system 100 includes a compressor 112 fluidically coupled to the fuel generator and intermediate products generated by the fuel generation system 100 are supplied to the compressor 112 at a first pressure, compressed (i.e., pressurized), and returned from the compressor 112 to the fuel generation system 100 at a second pressure greater than the first pressure.

As discussed in greater detail below, the fuel generator 102 includes a plurality of reaction regions in which catalytic reactions and other processes occur to convert the carbon dioxide and water (or hydrogen gas) into syngas, the syngas into methanol, and the methanol into olefins. Hydrogen from the hydrogen source 108 is thereafter used to hydrogenate the olefins to produce the fuel, e.g., a synthetic aircraft fuel and supplied to the fuel reservoir 110. The fuel generator 102 may adapted to generate fuel including, for example, long chain hydrocarbons, saturated linear hydrocarbons, paraffins, gasoline, kerosene, and the like.

In some embodiments, the carbon dioxide source 104 supplies carbon dioxide gas fuel generator 102 that is captured and/or extracted from ambient air where the carbon dioxide source 106 is disposed. The hydrogen source 108 provides hydrogen that may be generated from water using one or more of electrolysis, radiolysis, and the like. In some embodiments, the hydrogen suppled to the fuel generator 102 may be generated using a hydrogen production system disclosed in Kutsch, U.S. Pat. No. 12,080,441, issued Sep. 3, 2024, and entitled "Hydrogen Production system and Method of Using Same", which is incorporated herein in its entirety by reference. In some embodiments, the hydrogen source 108 may produce hydrogen from water and be integrated with the fuel generator 102.

Figure 2:
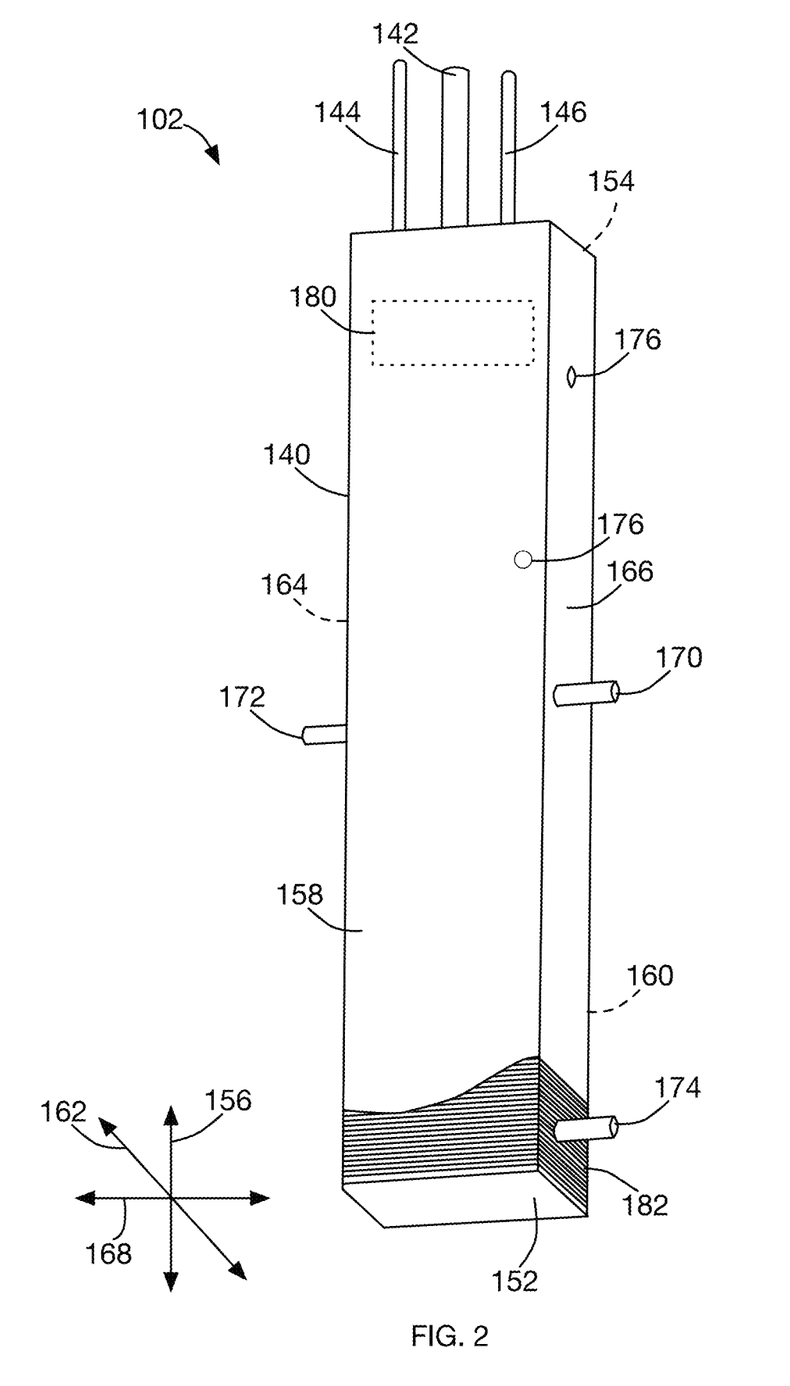
FIG. 2 is an isometric view of a monolithic fuel generation block of the system of FIG. 1.
Figure 3:
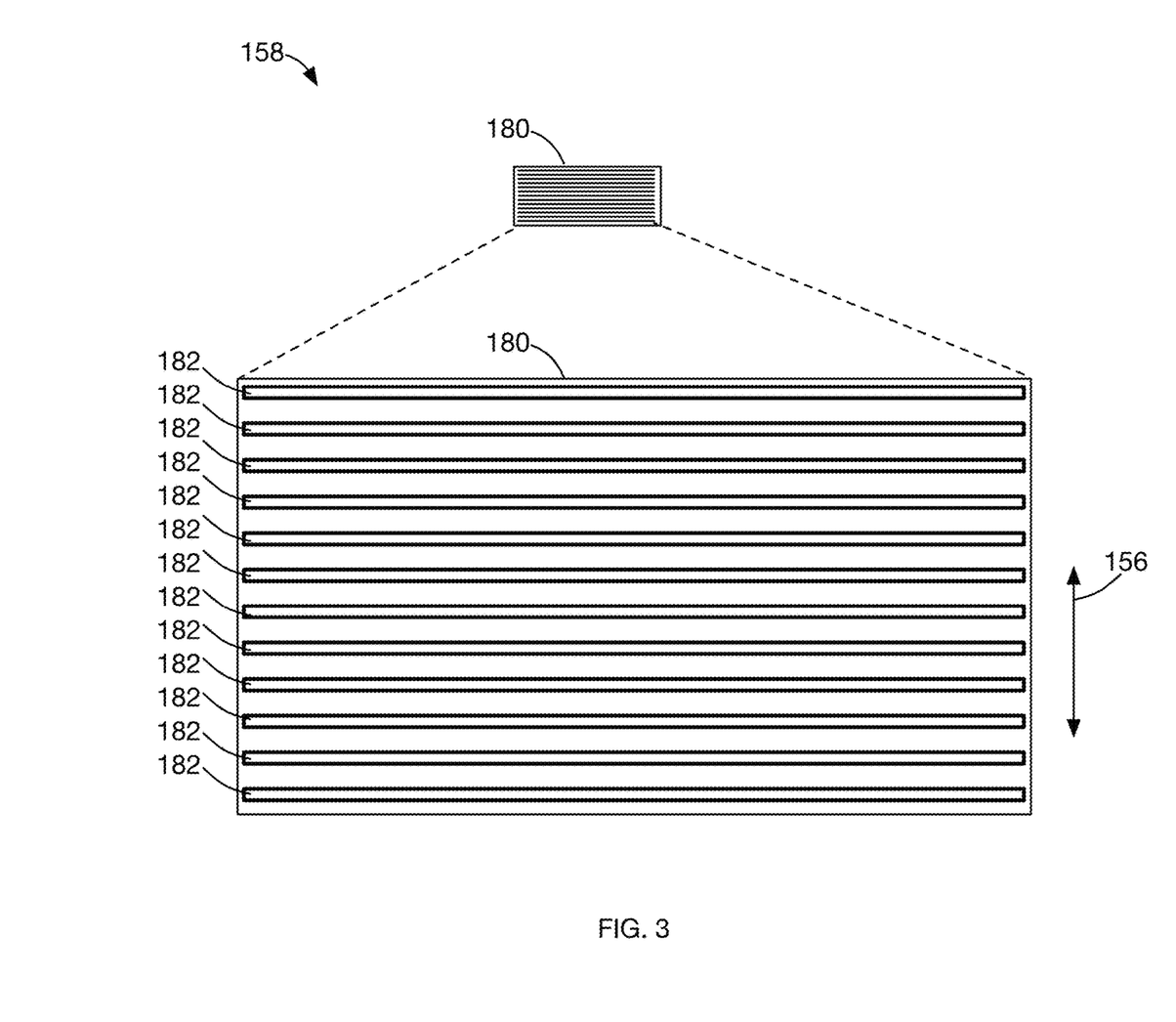
FIG. 3 is an exploded view of a portion of the monolithic fuel generation block of FIG. 1.

Referring also to FIGS. 2 and 3, in one embodiment, the fuel generator 102 comprises a monolithic block 140 having a carbon dioxide input port 142 that receives carbon dioxide from the carbon dioxide source 102, a water input port 144 that receives water from the water source 106, and a hydrogen input port 146 that receives hydrogen from the hydrogen source 108. The monolithic block 140 has a bottom bounding surface 152 and top bounding surface 154 opposite one another and separated along direction parallel to a vertical axis 156, a front bounding surface 158 and a rear bounding surface 160 opposite one another and separated along a direction parallel to a first horizontal axis 162, and a first side bounding surface 164 and a second boundary 166 opposite one another and separated along a direction parallel to a second horizontal axis 168. In some embodiments, one or more of the bounding surfaces 154, 156, 158, and 160 may be substantially planar. In some cases, one or more of pairs of opposite bounding surfaces 152 and 154, 158 and 160, and 164 and 166 may be substantially parallel.

During operation, the fuel generator 102 is disposed so that the base portion 154 is proximate the ground relative to the top portion 156. In this configuration, The carbon dioxide input port 142, water input port 144, and the hydrogen input port are 146 disposed on the top bounding surface 154 of the monolithic block and carbon dioxide, water, and hydrogen are supplied through these ports under pressure. These input materials are converted into intermediate products that have more mass per volume (i.e., are denser) than air and gravity facilitates the transport of such intermediate products through the fuel generator 102. Gravity also facilitates separation of more dense intermediate products from less dense intermediate products and gravity causes more dense intermediate products to flow toward the bottom bounding surface 152.

The fuel generator 102 also includes an intermediate material output port 170 and an intermediate material input port 172. The intermediate material output port 170 is fluidically coupled to an input port of the compressor 112 and the intermediate material input port 172 is fluidically coupled to an output of the compressor 112. As described above, the intermediate material flows from the output port 170, through the compressor 112, and is returned pressurized to the fuel generator 102 via the intermediate material input port 172.

A fuel output port 174 is disposed proximate the bottom bounding surface 152 and fluidically coupled to the fuel reservoir 110 so that fuel generated by the fuel generator 102 may flow from the fuel output port 174 and into the fuel reservoir 110.

In some embodiments, the fuel generator 102 may include one or more ports 176 through which probes (e.g., temperature, pressure, and the like) may be inserted to monitor operation of the fuel generator 102, additional processing materials may be introduced, and byproducts generated by the fuel generator 102 may be evacuated, and the like.

FIG. 3 shows an exploded view of a portion 180 of the front bounding surface 158 of the fuel generator 102. Referring also to FIG. 3, the fuel generator 102 is formed from a plurality of plates 182 stacked atop one another along the vertical axis 156 and bonded to one another to form the monolithic block 140 that forms the fuel generator 102. Each plate 182 of the monolithic block 140 may be manufactured from stainless steel or another metal or metal alloy. In some embodiments, the plate 182 is manufactured from a conductive, non-corrosive material. In some embodiments, each plate 182 has a thickness of between approximately 1 millimeter to approximately 4 millimeters. In one embodiment, the plate 182 has a thickness of approximately 2.5 millimeters. In some embodiments, between 100 and 5,000 plates 182 may be stacked and fused together to form the monolithic block 140. In other embodiments, more than 5,000 plates may be stacked and fused together to form the monolithic block 140. It should be apparent that the monolithic block 140 may comprise more or fewer plates 182. It should be apparent to one who has ordinary skill in the art that the plates 182 may be stacked along the first horizontal axis 162 or the second horizontal axis 168 in alternate embodiments. Further, a subset of the plates 182 that comprise the monolithic block 140 may be bonded (e.g., adhesively, heat fused, electron diffusion bonded, and the like) to one another to form a portion of the monolithic block 140 and thereafter a plurality of such portions may be bonded to one another to form the monolithic block 140.

As discussed in greater detail below, each plate 182 may include one or more orifices or voids formed therein so that when the plates are fused together the orifices form one or more processing regions comprising one or more separated chambers, channels, conduits that guide intermediate products produced in one region into another region, ports, and other formations that facilitate production of fuel by the fuel generator 102. Each processing region is shaped and configured to facilitate a particular type of chemical reaction or process necessary to transform the carbon dioxide, water, and hydrogen (or syngas and hydrogen) supplied via the input ports 142, 144, and 146, respectively, into intermediate products such as methanol, light olefins, oligomerized olefines, and the like and then into the fuel supplied from the output port 174.

In some embodiments, the plates 182 may be cut from sheets of material. Alternately, the plates 182 may be formed using an additive manufacturing process that deposits one or more layers of material atop one another to form each plate 182. In some embodiments, the plates 182 may be acid etched or CNC milled to form structures therein.

Figure 4:
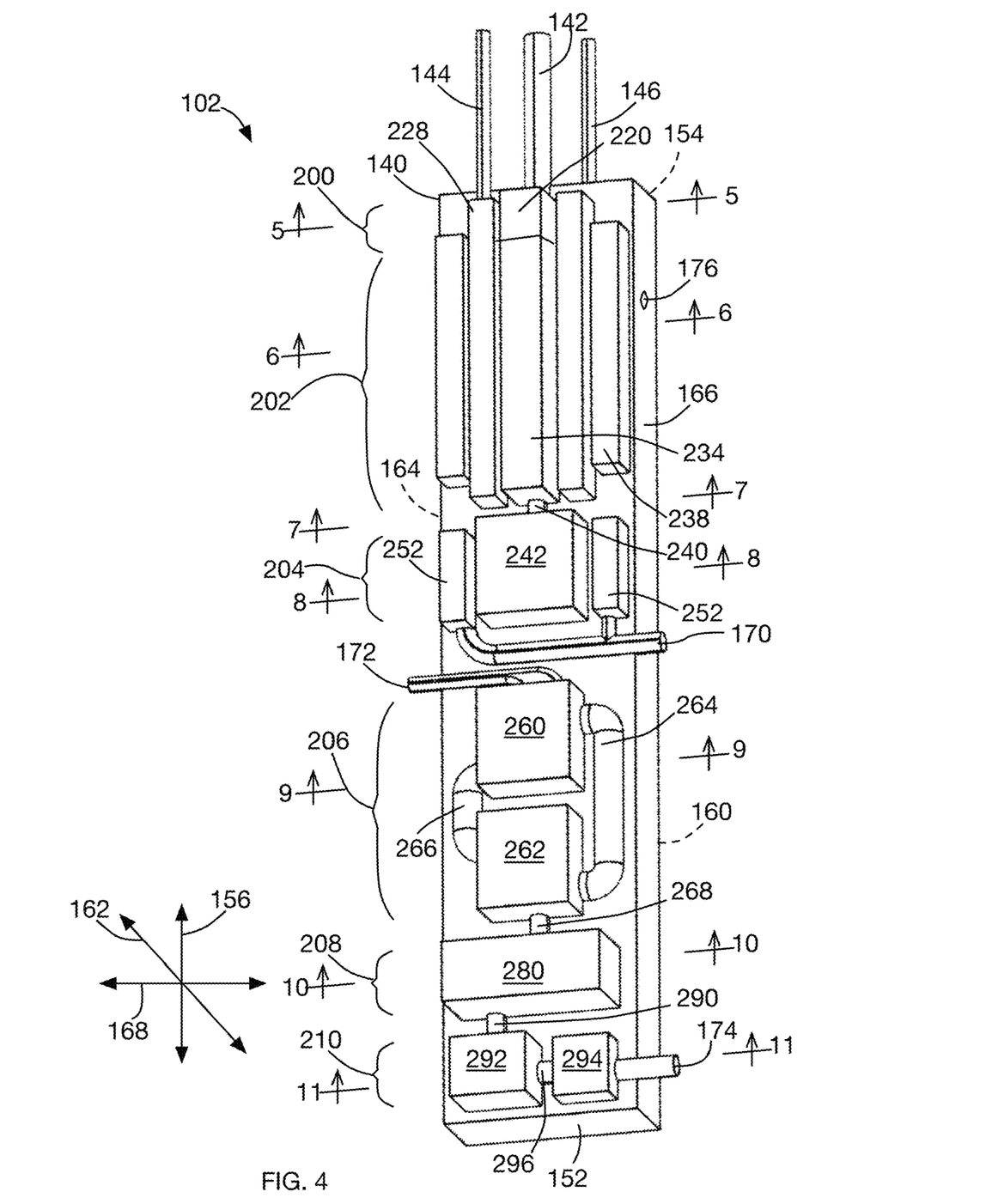
FIG. 4 is an isometric diagram of the monolithic fuel generation block of FIG. 1 with portion omitted to show internal sections of the monolithic fuel generation block.

FIG. 4 shows the monolithic block 142 that comprises the fuel generator 102 with portions omitted to show the internal structure of the monolithic block 140. The monolithic block 142 includes a plurality of fluidically connected regions, wherein each region comprises a reactor for undertaking a corresponding chemical reactions or processes to develop intermediate products that result in the synthetic fuel output from the monolithic block 140. Referring to FIG. 4, in one embodiment, the monolithic block 142 includes a syngas generation region 200, a methanol generation region 202, an olefin generation region 204, an olefin oligomerization region 206, a hydrogenation region 208, and a fuel separation region 210.

Figure 5:
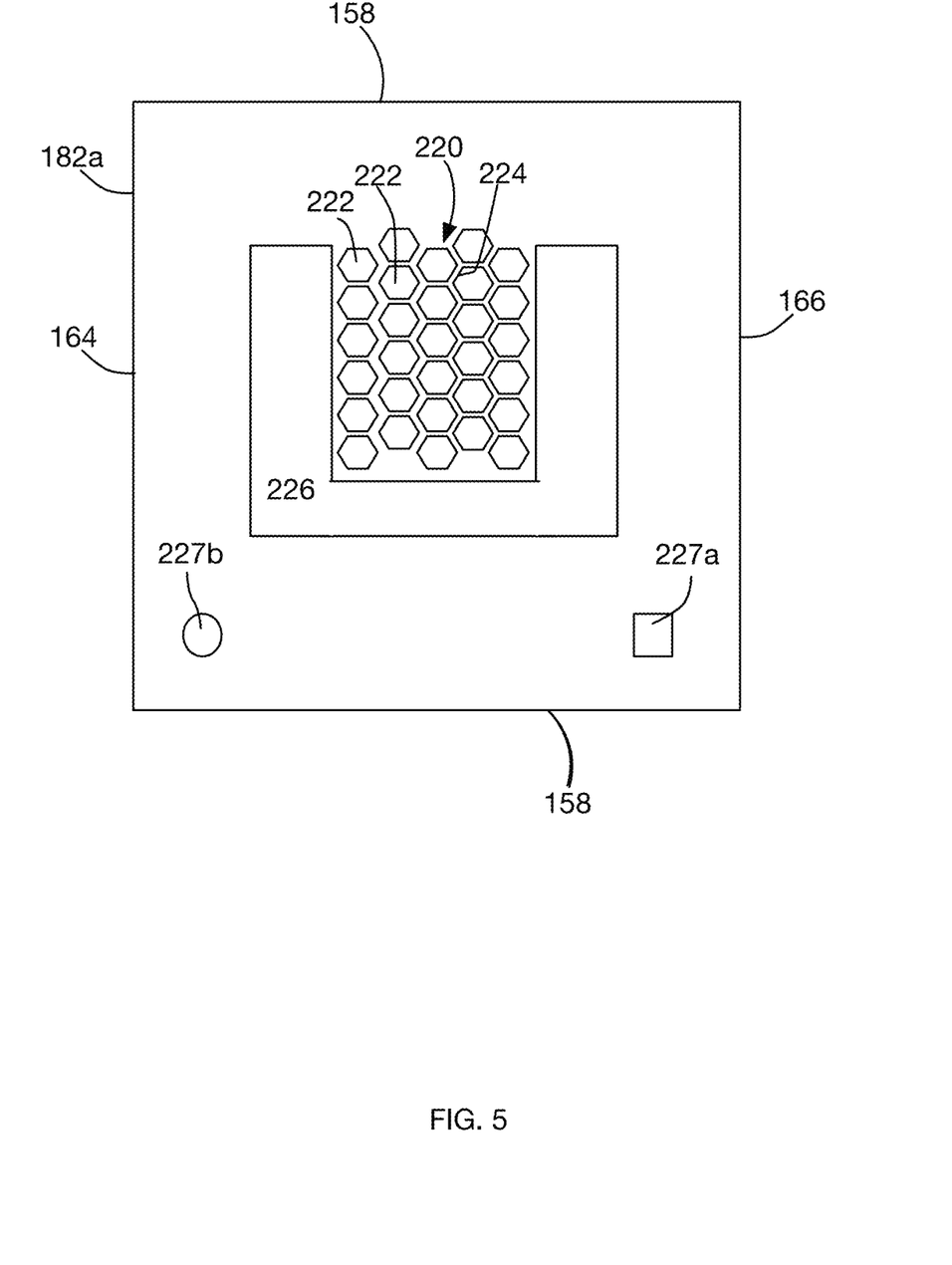
FIG. 5 is a plan view of a plate that may form at least a portion of a syngas generation region of the monolithic fuel generation block of FIG. 1.

FIG. 5 illustrates a plate 182a that may comprise at least a portion of the syngas generation region 200. Referring to FIG. 5, the plate 182a includes a plurality orifices or voids 222 formed therein. The interior walls 224 of each of the plurality of the orifices 222 are filled with and/or coated with a suitable catalyst. When a plurality of plates 182a are stacked atop one another and bonded, the plurality of orifices 222 of form a plurality of catalyst coated channels and form a reaction portion of the syngas generation region 200. The syngas generation region 200 includes an electrolysis system (not shown) that separates a portion of the water supplied through the water input port 144 into hydrogen and oxygen. The oxygen generated by electrolysis may be released into the ambient environment. Such hydrogen and the carbon dioxide supplied through the carbon dioxide input port 142 pass through the catalyst coated channels formed by the plurality of orifices 222 and react to produce syngas (i.e., a mixture of hydrogen and carbon monoxide) using a reverse water-gas-shift reaction. The catalyst may include, for example, iron, nickel, a copper based material). In some embodiments, such reaction is endothermic and is undertaken at between approximately 400 and approximately 900 degrees Celsius and at a pressures of approximately 25 bar.

The plate 182a also includes an orifice or void 226. When the plurality of plates 182a are stacked atop one another, the plurality of orifices 226 of such plurality of plates 182 form a jacket section 228 that surrounds the reaction portion 220 of the syngas generation region 200. A portion of the water supplied through the water input port 144 flows through the jacket section 228 and draws heat generated by the chemical reactions that occur to create steam for the electrolysis process or other process (not shown). Such heated water may be transported to other regions of the monolithic block 140 to supply heat needed to facilitate any endothermic reactions and/or processes in such other regions or systems.

The plate 182a and other plates 182 that form the monolithic block 140 may include additional orifices 227. When the plates 182 are stacked and bonded to form the monolithic block 140, such additional orifices 227 may form conduits and/or channels to facilitate transport of fluids (e.g., hydrogen gas, water, and the like), In addition, some of the channels formed by the orifices 227 may transport fluid proximate portions of the monolithic block 140 in which exothermic and endothermic reactions are undertaken to heat or cool, respectively, fluids flowing through such channels to facilitate the chemical reactions(s) in the monolithic block 140. In some cases, some of the channels formed by the plurality of the orifices 227 may be dwell channels through which material may flow to allow time for the material to stabilize before flowing into a subsequent process region of the monolithic block 140 or the output channel 172. In some embodiments, heating or chilling of materials in the monolithic block 140 may be accomplished by wrapping a section (or portion) of the exterior of the monolithic block 140 with a heating or cooling blanket or enclosure. Such blanket may provide heating or cooling inside and/or outside the monolithic block 140 as needed for processes that occur therein.

Figure 6:
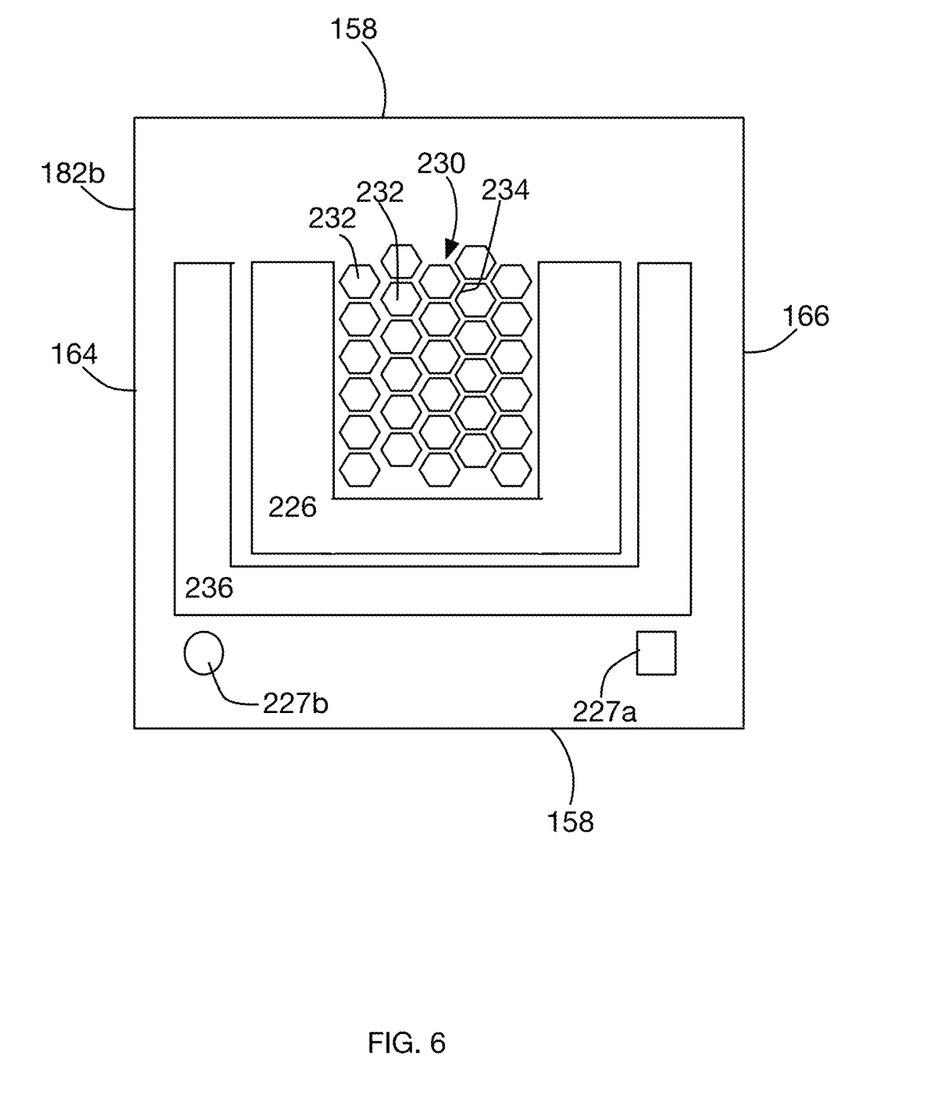
FIG. 6 is a plan view of a plate that may form at least a portion of a methanol generation region of the monolithic fuel generation block of FIG. 1.

FIG. 6 illustrates a plate 182b that may comprise at least a portion of the methanol generation region 202. The plate 182b includes a reaction portion 230 that comprises a plurality of orifices 232 and the interior walls 234 of each of the plurality of orifices 232 are filled with catalyst pellets and/or coated with a catalyst. When the plurality of plates 182b are stacked and bonded, the plurality of orifices 232 combine to form a plurality of catalyst filed and/or coated channels that are fluidically coupled to the syngas generation region 200 and that comprise a reaction portion 230 of the methanol generation region 202. The syngas formed in the syngas generation region 200 and a portion of the hydrogen supplied through the hydrogen input port 146 flow into the plurality of catalyst coated reaction channels formed by the plurality of the orifices 232 and react to form methanol. The reaction portion 230 of the methanol generation region 202 may be, in some cases, a multitubular fixed bed arrangement. The catalysts used in the reaction portion 230 of the methanol generation region 202 may include, for example, a copper/zinc oxide/alumina catalyst and the reactions therein may be undertaken at approximately 226 degrees Celsius. The hydrogen to syngas may be supplied to such reaction portion 230 in a ratio of 2.0.

Each plate 182b also includes a void 236 and when the plurality of plates 182b are stacked and bonded together, the void 236 forms a preheat gas jacket 238 that surrounds the water jacket 238 and the reaction portion 230 of the methanol generation region 202. In some embodiments, any gas or fluid that requires heating may flow through preheat jacket 238 and be heated.

In some embodiments, the syngas generation region 200 may be omitted from the monolithic block 140 and syngas from an external syngas source (not shown) may be supplied through the port 104 instead of carbon dioxide. Such syngas flows directly into the channels formed by the plurality of the orifices 232 that form the reaction portion 234 of the methanol generation region 202 with the portion of the hydrogen gas to produce methanol.

Figure 7:
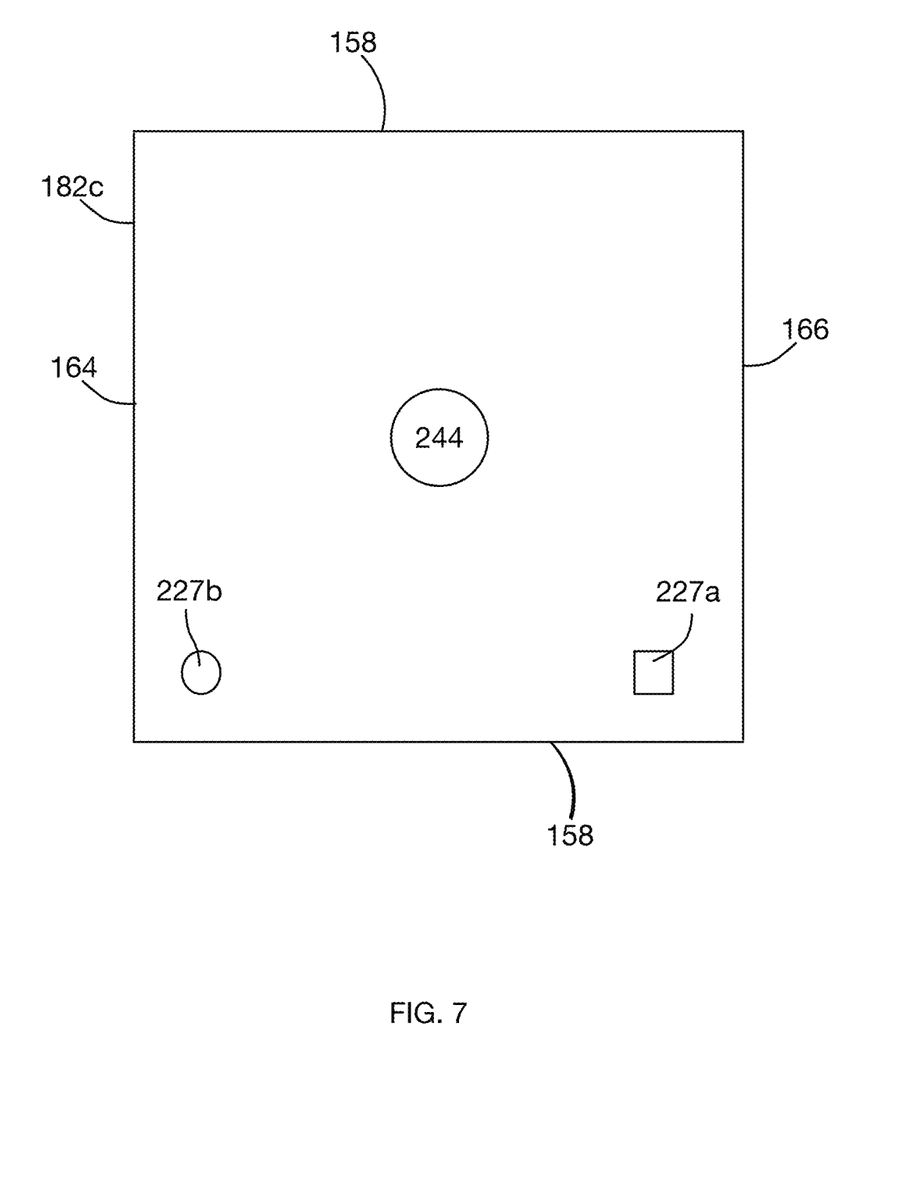
FIG. 7 is a plan view of a plate that may form at least a portion of a conduit of the monolithic fuel generation block of FIG. 1.

Methanol generated in the reaction channels formed by the orifices 232 of the methanol generation region 202 flows via a conduit or channel 240 into a methanol to an olefin reactor 242 of the olefin generation region 204. FIG. 7 illustrates a plate 182c that may be used to create the conduit 240 within the monolithic block 140. The plate 182c includes a void 244. When a plurality of plates 182c are stacked atop one another and bonded, a plurality of the voids 244 in such plates 182c combine to form the conduit section 240. Other conduits to carry fluid through regions of the monolithic block 140 may be formed in a similar manner.

Figure 8:
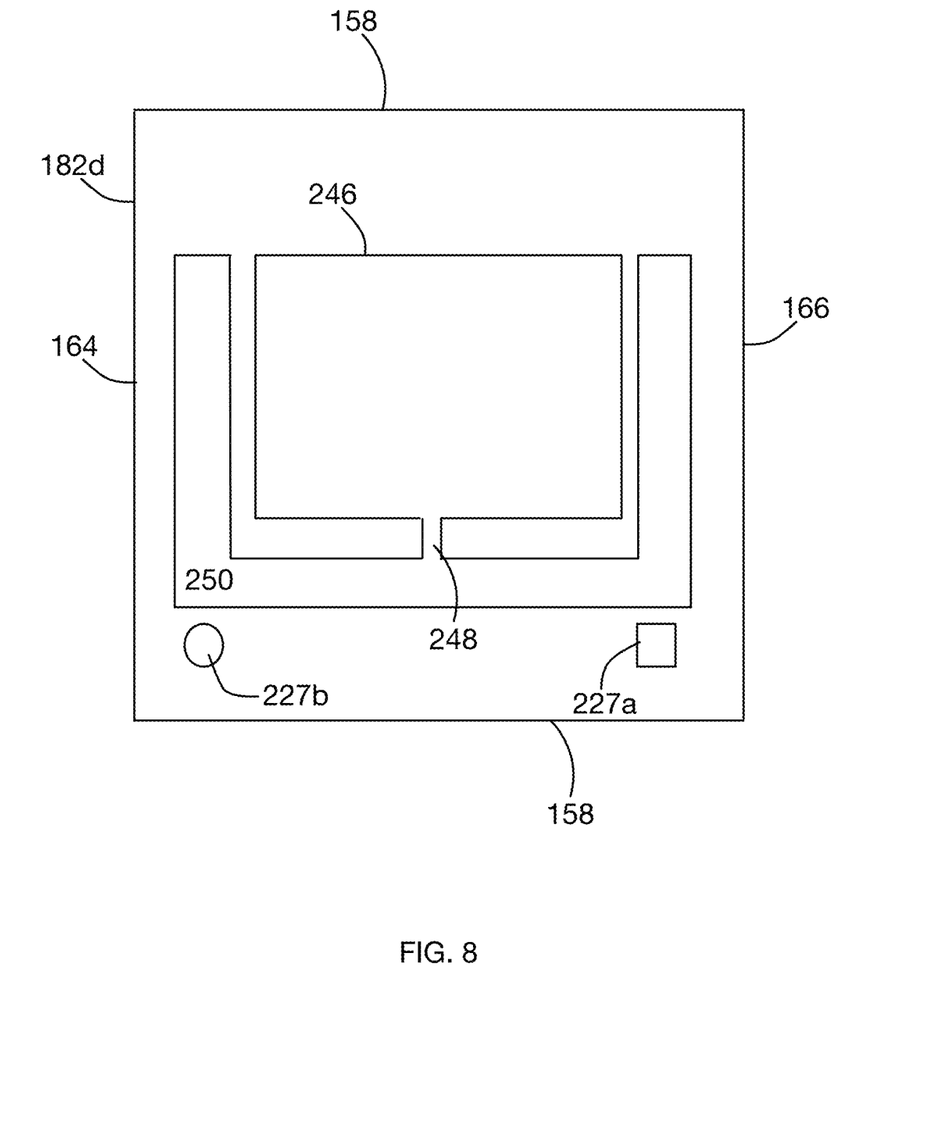
FIG. 8 is a plan view of a plate that may form at least a portion of an olefin generation region of the monolithic fuel generation block of FIG. 1.

FIG. 8 illustrates a plate 182d that may be used to form at least a portion of the olefin generation region 204. Referring to FIG. 8, the plate 182d includes a methanol to olefin reaction section 246, one or more channel portions 248, and an olefin separation section 250. When a plurality of plates 182d are stacked and bonded, a plurality of the olefin reaction section 246 of such plates 182d combine to form the methanol to olefin reactor 242 and a plurality of the olefin separation sections 250 combine to form an olefin separator 252. A plurality of the one or more channel portions 248 combine to form one or more channels or conduits through which olefins generated in the olefin reactor 242 are transported to the olefin separator 252. Thereafter, the olefins flow from the olefin separator 252 into the compressor 112 (FIG. 1) via the intermediate material output port 170. The olefin reaction section 246 includes microporous (e.g., pore size less than 2 nanometers) zeolite molecular sieve catalysts such as, for example, ZSM-5, ZSM-11, MCM-22, and the like and the reaction is undertaken at approximately 450 degrees Celsius and approximately 2 bar pressure. Such reaction is a high single-pass conversion of 95% of the reactants supplied and produces ethylene, 1-butene, and 1-pantene. Backpressure causes the olefins to flow from the olefin reactor 242 into the olefin separator 252. The olefin separator 252 recirculates molecules that are not sufficiently long through the olefin reactor 242.

The compressor 112 compresses the olefins and the compressed olefins flow through intermediate material input port 172 and into a first olefin oligomerizer 260 and are oligomerized. Shorter chain length oligomerized olefins flow from the first olefin oligomerizer 260 to a second olefin oligomerizer 262 via a conduit 264 before oligomerized olefins having longer chain lengths. Oligomerized olefins having shorter chain lengths in the second olefin oligomerizer 262 return to the first olefin oligomerizer 260 via a conduit 266. The first olefin oligomerizer 260 and the second olefine oligomerizer 262 each facilitate reactions that extend the hydrocarbon chains of the olefins therein via oligomerization. Oligomerized olefins that reach a desired chain length (i.e., hydrocarbon length) flow from the second olefin oligomerizer 260 into a conduit 268. It should be apparent to one who has ordinary skill in the art that that chain length of the oligomerized olefins is related to a boiling point thereof. In some embodiments, flows between the first and second olefin oligomerizers 260, 262 may be undertaken in a manner similar to those that occur in a distillation column.

Figure 9:
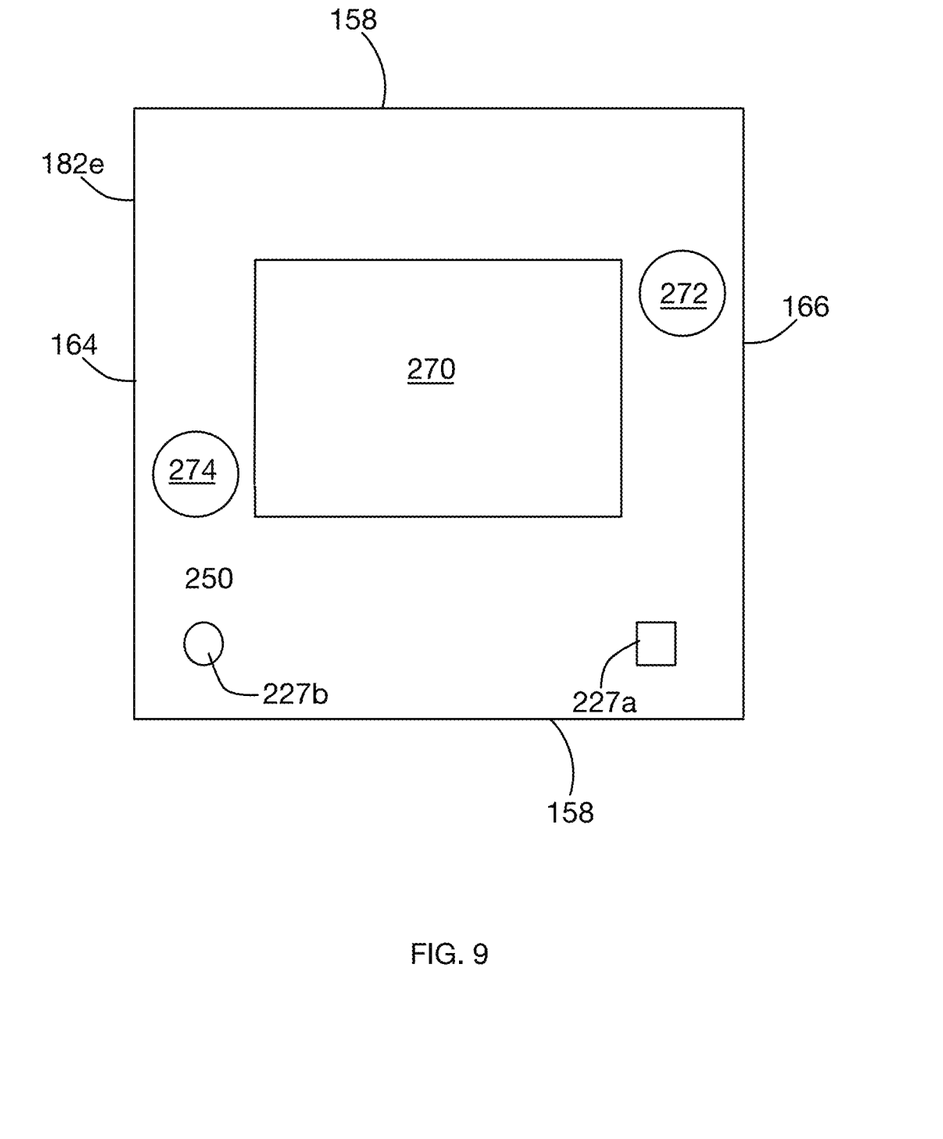
FIG. 9 is a plan view of a plate that may form at least a portion of an olefin oligomerization region of the monolithic fuel generation block of FIG. 1.

FIG. 9 shows a plate 182e that may be used to form at least portions of the first oligomerizer 260 and the first and second conduits 264, 266. Referring to FIG. 9, the plate 182e includes oligomerizer reaction section 270, a first orifice 272, and a second orifice 274. When a plurality of the plates 182e are stacked atop one another, a plurality of oligomerizer reaction sections 270 combine to form the first oligomerizer 260, a plurality of the orifices 272 combine to form the first conduit 262, and a plurality of the second orifices 274 combine to form the second conduit 266. The second oligomerizer 262 may be formed in a similar manner. The first oligomerizer reaction section 270 may include catalysts such as H-Beta Zeolite to facilitate reactions that convert dimers and trimers of C2 and C4 products to C6+ olefins in the presence of catalyst. Such reactions are exothermic and may be undertaken at approximately 299 degrees Celsius at a pressure of 21 bar.

A second oligomerizer reaction section of the 270 of the second oligomerizer 262 may include a catalyst such as Amberlyst (an acid catalyst made from styrene-divinylbenzene resin with sulfonic acid functional groups) to facilitate a reaction undertaken at approximately 163 degrees Celsius at 9.6 bar. Such reaction increases the yield to C9 and C18 compounds.

In some embodiments, the first and second oligomerizer reaction sections 270 of the first and second oligomerizes 260, 262 are fixed-bed designs having pellets of catalyst arranged randomly or in order in tubes therein. In some cases, such catalysts may be coated onto a honeycomb structure.

Figure 10:
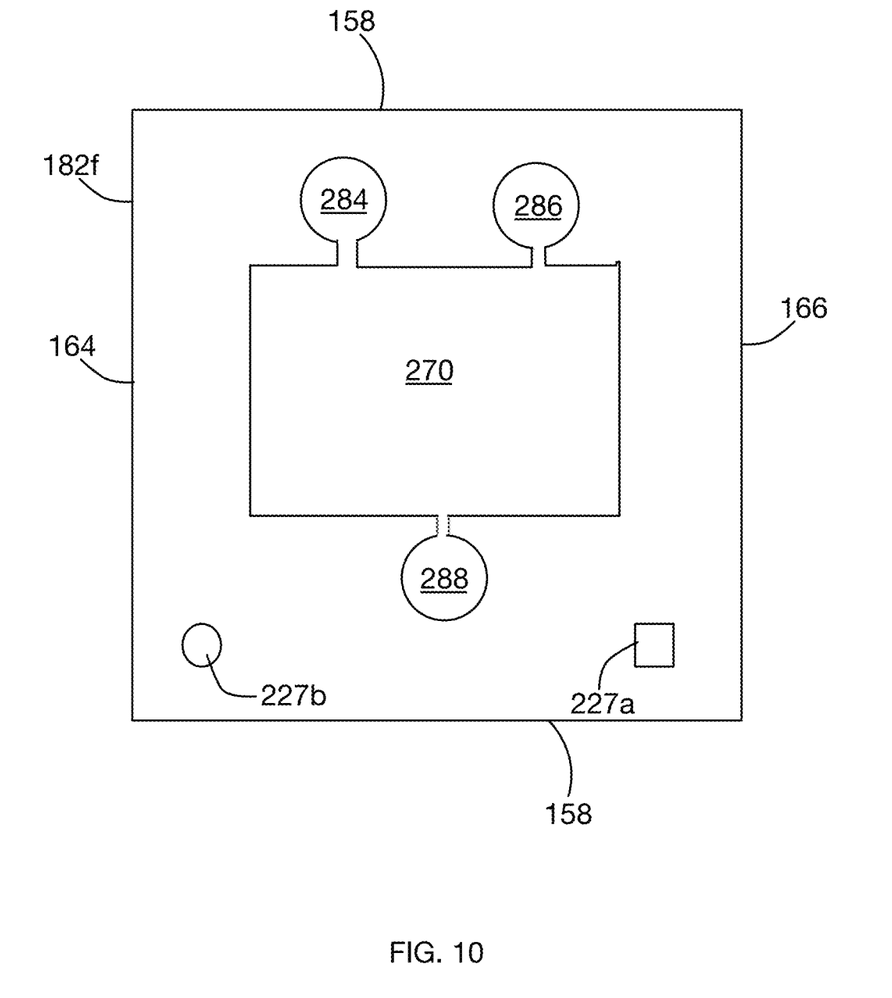
FIG. 10 is a plan view of a plate that may form at least a portion of a hydrogenation region of the monolithic fuel generation block of FIG. 1.

As noted above, oligomerized olefins having sufficient chain length (e.g., via gravity) from the second oligomerizer 262 via the conduit 268 into the hydrogenation region 208. In some embodiments, such chain length may be between C8 to C16, and more particularly between C10 and C14 (that corresponds to Jet-A and Jet-A1 fuel). The hydrogenation region 208 comprises hydrogenator 280 fluidically coupled to the conduit 268 and the olefins are hydrogenated in the hydrogenator 280 using hydrogen supplied through the hydrogen input port 146. FIG. 10 illustrates a plate 182f that may be used to form at least a portion of the hydrogenation region 208. The plate 182f includes a hydrogenator reaction portion 282 and a first orifice 284, a second orifice 286, and a third orifice 288 fluidically coupled to the hydrogenator reaction portion 282. When a plurality of plates 182e are stacked atop one another and bonded, a plurality of hydrogenator reaction portions 282 combine to form the hydrogenator 280. Further, a plurality of the orifices 284 combine to form a channel that is fluidically connected to the conduit 268, a plurality of the orifices 286 combine to form a channel that is fluidically connected to the hydrogen input port 146, and a plurality of the orifices 288 combine to form a channel that is fluidically connected to a fuel output conduit 290 of the hydrogenator 280 (and thus the hydrogenation region 208). The hydrogenator reaction portion 282 may be a fixed bed, e.g. a multitubular fixed bed structure, and that include a palladium on alumina catalyst to facility a reaction at 400 degrees Celsius at 9 bar total pressure. In some embodiments, 70% of the total pressure is supplied by, for example, the partial pressure of the hydrogen gas.

Fuel flows from the fuel output conduit 290 to the fuel separation region 210. The fuel separation region 210 comprises a fuel separator 292 and a fuel blender 294. The fuel separator 292 is fluidically coupled to the conduit 290 and also to the fuel blender 294 via a conduit 296. The fuel blender 294 is coupled to the fuel output 174 through which fuel produced by the fuel generator 102 is supplied to the fuel reservoir 110.

Figure 11:
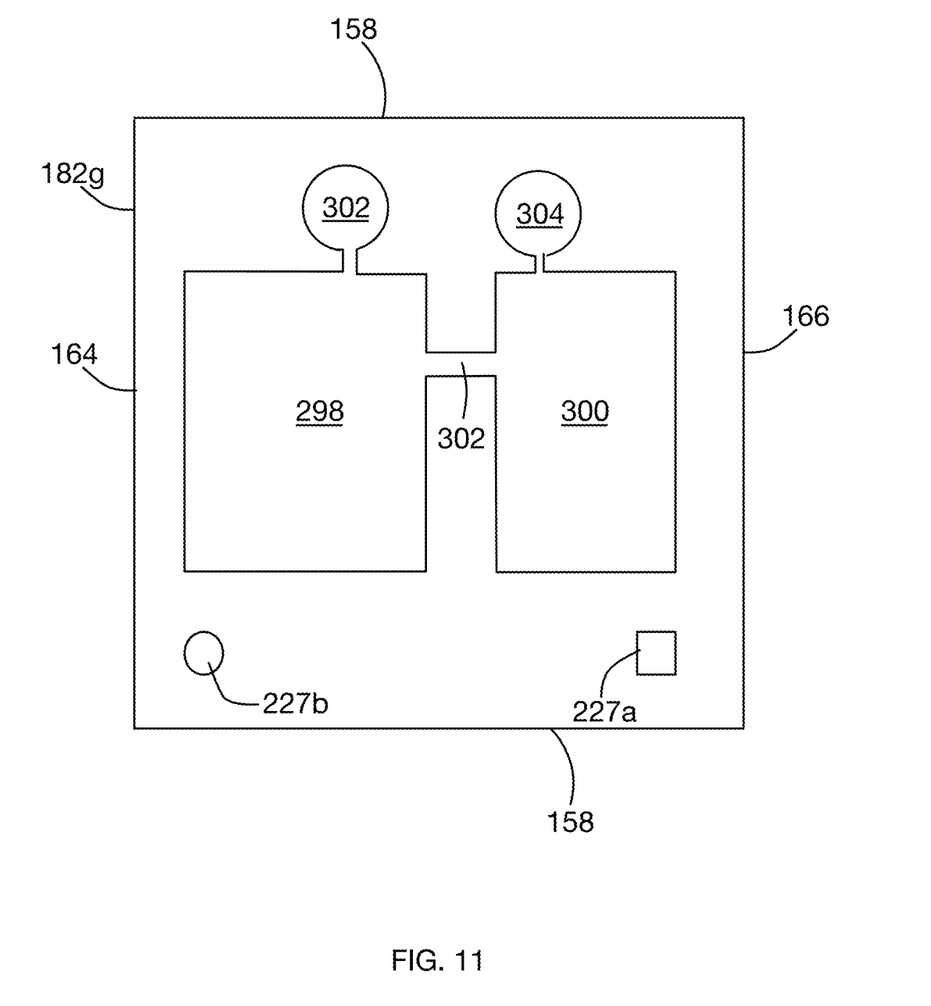
FIG. 11 is a plan view of a plate that may form at least a portion of a fuel separation region of the monolithic fuel generation block of FIG. 1.

FIG. 11 shows a plate 182e that may be used to form at least a portion of the fuel separation region 210. Referring to FIG. 11, the plate 182e includes a fuel separation section 298 and a fuel blending section 300 and a channel 302 therebetween. The plate 182e also includes an orifice 302 fluidically coupled to the fuel separation section 298 and an orifice 304 fluidically coupled to the fuel blending section. When a plurality of the plates 182e are stacked and bonded, the plurality of fuel separation sections 298 combine to form the fuel separator 292, the plurality of fuel blending sections combine to form the fuel blender 294, and the plurality of channels 302 combine to form the conduit 296. Further, the orifices 302 combine to form a channel fluidically coupled to the fuel output conduit 290 from the hydrogenator 280 and the orifices 304 combine to form a channel fluidically coupled to the fuel output port 174 of the fuel generator 102. In some embodiments, the fuel separator 292 may be configured as a fractionator or a fractional distillation column. In some embodiments, the fuel separator 292 may be external to the block 140 and mixed fuel may flow from the output port 174 through the external fuel separator, and fuel separated by the external fuel separator may be supplied to the fuel reservoir 110.

The fuel generator 102 comprising the single, unitary, bonded monolithic block 140 may reduce the complexity and costs associated to conventional fuel generation systems or factories. The reduction in complexity and costs may be realized at least because the separate reaction, heating, cooling tanks and the like, and associated piping and fitting components of such factories may be compressed into a single unit such as the monolithic block 140 described herein.

While particular embodiments of the present invention have been illustrated and described, it would be apparent to those skilled in the art that various other changes and modifications can be made and are intended to fall within the spirit and scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A fuel generator, comprising:
   a monolithic block comprising a plurality of plates stacked and bonded together;
   a first input port disposed on the monolithic block, wherein the first input port is coupled to a source of hydrogen gas;
   a second input port disposed on the monolithic block, wherein the second input port is coupled to a source of carbon dioxide or syngas; and
   an output port disposed on the monolithic block, wherein the output port is coupled to a fuel reservoir;
   wherein the plurality of plates form a plurality of reaction regions, wherein at least a portion of the plurality of reaction regions convert one of the carbon dioxide or syngas and hydrogen into a hydrocarbon fuel, wherein the hydrocarbon fuel is supplied from the output port; and
   wherein a first subset of the plurality of plates are bonded to form at least a portion of a methanol generation region, a second subset of the plurality of plates are bonded to form at least a portion of an olefin generation region, a third subset of the plurality of plates are bonded to form at least a portion an oligomerization region, and a fourth subset of the plurality of plates are bonded to form a hydrogenation region.

2. The fuel generator of claim 1, wherein methanol is produced from the syngas in the methanol generation region.

3. The fuel generator of claim 2, wherein olefins are produced in the olefin generation region from the methanol produced in the methanol generation region.

4. The fuel generator of claim 3, wherein oligomerized olefins are produced in the oligomerization region from the olefins produced in the olefin generation region.

5. The fuel generator of claim 4, further including a compressor coupled to the olefin generation region and the oligomerization region, wherein olefins produced in the olefin generation region are compressed by the compressor before flowing into the oligomerization region.

6. The fuel generator of claim 5, wherein the compressor is external to the monolithic block.

7. The fuel generator of claim 5, wherein the oligomerization region comprises a plurality of connected oligomerization reactors.

8. The fuel generator of claim 5, wherein oligomerized olefins are separated in accordance with density in the oligomerization region.

9. A method for generating fuel comprising:
   providing a monolithic block, wherein the monolithic block is formed from a plurality of plates stacked and bonded together to form a plurality of reaction regions, and the monolithic block includes a first input port, a second input port, and an output port, wherein providing the monolithic block comprises:
      bonding a first subset of the plurality of plates to form at least a portion of a methanol generation region,
      bonding a second subset of the plurality of plates to form at least a portion of an olefin generation region,
      bonding a third subset of the plurality of plates to form at least a portion an oligomerization region, and
      bonding a fourth subset of the plurality of plates to form a hydrogenation region;
   supplying hydrogen gas to the first input port;
   supplying one of carbon dioxide or syngas to the second input port;
   converting the hydrogen gas and one of the carbon dioxide or syngas in the plurality of reaction region into a hydrocarbon fuel; and
   supplying the hydrocarbon fuel from the output port.

10. The method of claim 9, further including producing methanol from the syngas in the methanol generation region.

11. The method of claim 10, further including producing olefins in the olefin generation region from the methanol produced in the methanol generation region.

12. The method of claim 11, further including producing oligomerized olefins in the oligomerization region from the olefins produced in the olefin generation region.

13. The method of claim 12, further including compressing the olefins produced in the olefin generation region before flowing into the oligomerization region.

14. The method of claim 13, further including coupling monolithic block to a compressor external to the monolithic block and operating the compressor to compress the olefins.

15. The method of claim 13, wherein the oligomerization region comprises a plurality of connected oligomerization reactors.

16. The method of claim 13, further including separating the oligomerized olefins in accordance with density in the oligomerization region.

* * * * *